United States Patent
Naum et al.

(10) Patent No.: US 8,034,257 B2
(45) Date of Patent: Oct. 11, 2011

(54) UV SOLID LIGHT SOURCE OF INORGANIC POWDER

(75) Inventors: Soshchin Naum, Taipei (TW); Wei-Hung Lo, Taipei (TW); Chi-Ruei Tsai, Taipei (TW)

(73) Assignee: Wei-Hung Lo, Taipei (TW)

( * ) Notice: Subject to any disclaimer, the term of this patent is extended or adjusted under 35 U.S.C. 154(b) by 701 days.

(21) Appl. No.: 12/076,288

(22) Filed: Mar. 17, 2008

(65) Prior Publication Data

US 2008/0164441 A1 Jul. 10, 2008

Related U.S. Application Data

(63) Continuation-in-part of application No. 11/144,762, filed on Jun. 6, 2005, now abandoned.

(51) Int. Cl.
*C09K 11/79* (2006.01)
(52) U.S. Cl. .................................... 252/301.4 F
(58) Field of Classification Search ............. 252/301.4 F
See application file for complete search history.

(56) References Cited

U.S. PATENT DOCUMENTS 6,765,237 B1 7/2004 Doxsee et al.
6,940,221 B2 * 9/2005 Matsukiyo et al. ........... 313/496

OTHER PUBLICATIONS

Born et al, "A study of phoshors in the yttrium oxide-silicon diozide phase system", Jour. Mat'l Sci, Lett., 4, 1985, pp. 497-501.*
Park, J., et al.; "White light-emitting diodes of GaN-based Sr2SiO4:Eu and the luminescent properties"; Applied Physics Letters; vol. 82, No. 5, Feb. 2003, pp. 683-685.

* cited by examiner

*Primary Examiner* — Carol M Koslow
(74) *Attorney, Agent, or Firm* — Rosenberg, Klein & Lee

(57) ABSTRACT

An inorganic powder uses a UV solid light source applied for the UV LEDs, in which an inorganic powder is based on the inorganic powder of n-silicate group II elements, and its ingredients have valence 2 ions, such as $Eu^{+2}$, $Sm^{+2}$, $Yb^{+2}$ and $Dy^{+2}$, valence 3 ions $Ce^{+3}$, $Tb^{+3}$ and/or $Eu^{+3}$. The chemical formula of the components is $Me^{+2}_{1-x}Ln^{+3}_{2-y}Si_2O_8:TR^{+2}_x:TR^{+3}_y$, and x=0.0-0.2, y=0.0-0.1. A main structure thereof is a hexagonal crystal structure. When the indium gallium nitride and gallium nitride based allomorphous semiconductor short wave UV light is used under conditions of excitement, the multiple band white light can be obtained.

6 Claims, No Drawings

UV SOLID LIGHT SOURCE OF INORGANIC POWDER

REFERENCE TO RELATED APPLICATION

This application is a Continuation-in-Part of patent application Ser. No. 11/144,762, filed 6 Jun. 2005, now abandoned.

BACKGROUND OF THE INVENTION

1. Field of the Invention

An inorganic powder uses a UV solid light source. The chemical formula of main component is $Me^{+2}_{1-x}Ln^{+3}_{2-y}Si_2O_8:TR^{+2}_x:TR^{+3}_y$. When the indium gallium nitride and gallium nitride-based allomorphous semiconductor short wave UV light is being used under conditions of excitement, multiple band white light can be obtained.

2. Description of Related Art

In recent years, the manufacturing technology of the solid light source has improved continuously. The efficiency of illumination is greatly increased. Since the solid light source may emit nearly monochrome light, and is highly reliable, enjoys longevity, and can be broadly applied, it has been used in many lighting equipment applications. There is a trend of replacing traditional vacuum light bulbs with solid light sources.

A white light source is mixed from multiple colors of light. The white light that can be observed by human eyes contains a mixture of light with at least two or more wavelengths. When human eyes are simultaneously excited by red, blue and green light, or simultaneously excited by the cross compensation light of blue and yellow light, the light is perceived as white light. This principle can be used to generate a solid light source for the white light.

There are main four conventional means of white solid light source generation. The first method uses three solid light sources using InGaAlP, GaN and GaN as materials. The electric current passes, under respective control, through the solid light sources and emits red, green and blue light. Then, a lens is used to mix the light emitted to generate white light.

The second method uses two solid light sources with GaN and GaP as materials. The current passing through these solid light sources is also individually controlled to emit blue and yellow-green light to generate white light. Although the efficiency of illumination for the above mentioned two methods may reach 20 lm/W, if one of the different color solid light sources fails, normal white light cannot be obtained. Additionally, the positive bias is different. Thus, many sets of control electric circuits are required. The cost is high. These are many disadvantages of practical applications.

The third method was developed in 1996 by Nichia Chemical of Japan. An indium gallium nitride blue solid light source and a yellow light-emitting yttrium aluminum garnet fluorescent material are used to form a white light source. Although, at the present time, the efficiency of illumination (as high as 15 lm/W) is lower than those the prior two methods, only one solid light source chip set is required. The manufacturing cost is reduced significantly. Furthermore, the formulation and production technology for the fluorescent material is mature, and commercial products are available.

However, methods two and three utilize a color compensation principle to generate white light. The continuity of spectrum wavelength distribution is not as good as sunlight. After the mixture of the colored light, in the visible light spectrum range (400 nm-700 nm), the color is not even. The saturation of color is low. This phenomenon can be ignored by human eyes, because they only perceive white light. However, high precision optical detectors, such as a video camera or camera, perceive the color rendering as low. Errors will be caused during reduction. Thus, the white light sources generated by these methods can only be used for simple lighting applications.

The fourth white light generating method was developed by Sumitomo Electric Industries, Ltd of Japan. It uses ZnSe material as the white solid light. A CdZnSe thin film is first formed on the ZnSe single crystal baseboard. After energizing, the thin film emits blue light. At the same time, a portion of the blue light shines on the baseboard and emits a yellow light. Finally, the blue and yellow light compensate each other and generate white light. This method utilizes only a solid light source crystal. The operation voltage is only 2.7V, lower than the 3.5V required for a GaN solid light source. Additionally, its generation of white light does not require fluorescent material. However, the disadvantages are that the efficiency of illumination is only 8 lm/W, and the service life is only 8000 hours.

In addition to the aforesaid white light generation methods by a solid light source, according to the prior art there is controlled exciting of $Y_3Al_5O_{12}$, a co-fluorescent material wave spectrum attempt. The additives used to replace Al are Ga or Sc. Alternatively, Lu, Tb, and Sm are used to replace Y to achieve limited results. However, these fluorescent material radiation light spectrum are normally located in the green-yellow zone of visible light. It cannot integrate the design of solid light source and the soft white light generated by white lamp with equivalent color temperature of T=2800K-3500K.

In the current art method announced by J. K. Park, the white solid light source uses Ga—N as a base, and its cold light properties. ("White Light-emitting Diodes of Ga—N-Based $Sr_2SiO_4$:Eu and the Luminescent Properties" J. Electrochem. Solid State Lett., vol 5 {2002} p. H11). The chemical composition used is silicate inorganic powder based on strontium compounds and with the chemical formula as $Sr_{2-x}Eu^{+2}_xSiO_4$, wherein x can be 0.1, 0.05, 0.03, or 0.005 shown in the disclosure of "White Light-emitting Diodes of Ga—N-Based Sr2SiO4:Eu and the Luminescent Properties." The principle of illumination of inorganic powders is related to the transfer radiation of $Eu^{+2}$ replacement of $Sr^{+2}$ ions at the crystal sieve anode nodes. The limited utilization of n-silicate inorganic powder production of standard blue light In—Ga—N allomorphous in a white solid light source is that the short wave wavelength used for self-excitement is around $\lambda \leq 420$ nm, where $\lambda=395$ nm, $\lambda=405$ nm, and $\lambda=380$ nm are used.

Although after the aforesaid n-silicate inorganic powder $Sr_{2-x}Eu^{+2}_xSiO_4$ (x can be 0.1, 0.05, 0.03, or 0.005) is excited by the UV light, the radiation light spectrum is yellow-green, and cold color-adjusted white light can be obtained. Compared to the production equipment of present art used yttrium aluminum garnet fluorescent material, it has much higher Rendering index. It offers the main advantages of the n-silicate inorganic powder solid light source. However, obtaining this advantage can only be achieved when double portions of inorganic powder mixing agents are used in the solid light source.

In addition to the above-mentioned disadvantages that double portions of inorganic powder mixing agents must be used, the strontium europium based n-silicate material has a very low efficiency. When the angles used for the produced white light diodes $Sr_{2-x}Eu^{+2}_xSiO_4$ (x can be 0.1, 0.05, 0.03, or 0.005) are between 30° and 120°, the light intensity is J=0.1-0.3 candlelight. At the same time, the temperatures of this diode should not exceed 80-90° C. That is, when a solid light source is heated to these values, the light brightness is reduced by half. In addition, the temperatures used in the generation process of the inorganic powder are T=1100-1200° C. This is not sufficient to combine the quantum effect of the inorganic powders. During the synthesizing of various known silicate inorganic powder, the vitrification of products is easily occurs. This forces the grinding of the vitrified inorganic powder and leads to lower quantum effect.

For the present art that uses UV light as solid light source chips, such as U.S. Pat. No. 6,765,237 "White light-emitting device based on UV solid light source and phosphor blend", a fluorescent body is provided that is the combination of two chemical components, to achieve the UV light excited white light solid light source.

SUMMARY OF THE INVENTION

This invention relates to a type of UV solid light source's inorganic powder. The components of the inorganic powder include valence 2 ions, such as $Eu^{+2}$, $Sm^{+2}$, $Yb^{+2}$ and $Dy^{+2}$, valence 3 ions $Ce^{+3}$, $Tb^{+3}$, and $Eu^{+3}$. The chemical formula of the component is $Me^{+2}_{1-x}Ln^{+3}_{2-y}Si_2O_8:TR^{+2}_x:TR^{+3}_y$. In one embodiment, the element is $Me^{+2}$=(among $Mg^{+2}$, $Ca^{+2}$, $Sr^{+2}$, $Ba^{+2}$, at least one or more); $TR^{+2}$=(among $Sm^{+2}$, $Yb^{+2}$, $Eu^{+2}$, $Dy^{+2}$, at least one or more); $TR^{+3}$=(among $Tb^{+3}$, $Ce^{+3}$, $Eu^{+3}$, $Dy^{+3}$, at least one or more); and $Ln^{+3}$=(among $Y^{+3}$, $La^{+3}$, $Gd^{+3}$, $Sc^{+3}$, $Lu^{+3}$, at least one or more). In other words, $Me^{+2}$ can be at least one $Mg^{+2}$, $Ca^{+2}$, $Sr^{+2}$, $Ba^{+2}$; $TR^{+2}$ can be at least one of $Sm^{+2}$, $Yb^{+2}$, $Eu^{+2}$, $Dy^{+2}$; $TR^{+3}$ can be at least one of $Tb^{+3}$, $Ce^{+3}$, $Eu^{+3}$, $Dy^{+3}$; $Ln^{+3}$ can be at least one of $Y^{+3}$, $La^{+3}$, $Gd^{+3}$, $Sc^{+3}$, $Lu^{+3}$.

The aforesaid structure is mainly a hexagonal crystal structure, ensuring that when the component utilizes indium gallium nitride and gallium nitride based allomorphous semiconductor short wave UV light under conditions of excitement, the multiple band white light can be obtained.

However, the component forms a circulation system for the cation sub lattice. The concentration of each element is: $0 \leq Mg \leq 0.2$; $0.4 \leq Ca \leq 0.8$; $0.2 \leq Sr \leq 0.4$; and $0.2 \leq Ba \leq 0.4$. The concentration relationship formula is $\Sigma(Me^{+2}+TR^{+2})=1$.

BRIEF DESCRIPTION OF THE DRAWINGS

No drawings are included with the description of the preferred embodiments.

DETAILED DESCRIPTION OF PREFERRED EMBODIMENTS

This invention utilizes UV light to excited a white solid light source.

The novel combination of the inorganic powder for a UV solid light source is based on the n-silicate II group elements inorganic powder to overcome the defects found in the present art.

A catalyst fluorescent material is proposed. It includes valence 2 ions, such as $Eu^{+2}$, $Sm^{+2}$, $Yb^{+2}$ and $Dy^{+2}$, and valence 3 ions $Ce^{+3}$, $Tb^{+3}$, $Eu^{+3}$, and $Dy^{+3}$.

A stable and standard equipment that can be repeatedly used for the inorganic powder synthesis process is developed.

A new inorganic powder for a short wave solid light source is produced, passing materials to excite the UV light, violet and blue light zones of the visible light, and expand the light spectrum.

For short wave ultra violet and blue solid light source, the n-silicate II and III subgroup based inorganic powders can be used. The chemical formula of the components has the following characteristics:

$$Me^{+2}_{1-x}Ln^{+3}_{2-y}Si_2O_8:TR^{+2}_x:TR^{+3}_y$$

where $Me^{+2}$=(among $Mg^{+2}$, $Ca^{+2}$, $Sr^{+2}$, $Ba^{+2}$, at least one or more); $TR^{+2}$=(among $Sm^{+2}$, $Yb^{+2}$, $Eu^{+2}$, $Dy^{+2}$, at least one or more); $TR^{+3}$=(among $Tb^{+3}$, $Ce^{+3}$, $Eu^{+3}$, $Dy^{+3}$, at least one or more); $Ln^{+3}$=(among $Y^{+3}$, $La^{+3}$, $Gd^{+3}$, $Sc^{+3}$, $Lu^{+3}$, at least one or more). The chemical normality index ratio relationships are x=0.000-0.2, y=0.000-0.1. The main crystal lattice is hexagonal crystal structure, which ensures that the fluorescent material can receive the multiple band light radiation coming from the allomorphous semiconductor short wave light.

The aforesaid materials may be called a two dimensional n-silicate with double catalyst. The crystal lattice has two different valence cation fields. Valence two cations, such as Ca, Sr, and Ba form fields with valence values as K1=6 or K1=8. Only after entering $Mg^{+2}$ ion into the cation sub lattice, the valence values may then be lowered to K1=4. From another angle, when valence two fields are replaced by large particle $Ba^{+2}$ ions, and the valence values may be increased to K1=10 or K1=12. For rare earth elements, such as Y or Gd field, the valence values are lower, such as K2=6 or K2=8. For small particle $Lu^{+3}$ ions, radius $r_{Lu}$=0.85 A, the reserved valence value is K2=6. When large scale $La^{+3}$ ions are used, the valence values are increased to K2=8 or K2=10.

For the two dimensional n-silicate crystal matrix, the valence value difference for the two cation fields changes as the internal electric fields that affect the layout of catalyst ions inside the lattice nodes. The first and second nodes of the two dimensional n-silicate's crystal lattice are surrounded by oxygen ions. The valence value is lower, K0=4 inside the crystal lattice the $SiO_4$ tetrahedron on the edge possesses island properties; i.e. they are not in contact with a top or edge. Large-scale silicone oxide tetrahedron is suitable for absorbing the initial exciting energy. Thus, for two dimensional n-silicate based inorganic powder, not only direct excitement, due to direct transfer of quantum energy toward catalytic ions, is possible, but also the absorption of lattices.

This invention thus describes a series of chemicals:

$$CaLa_2Si_2O_8 - CaCl_2Si_2O_8 - CaY_2Si_2O_8$$

It is determined that these chemicals are completely soluble in cerium components of product solid phase matrix. This is one of the main advantages for recommending n-2-silicate based phase against single phase and n-silicate. Single phase and n-silicate based inorganic powder cannot form a continuous band of catalyst cation (Ce, Nd, Eu) solid solutions, with the same low crystal capacity. That is, the catalyst dissolves very little within the inorganic powder base materials lattice. The low values of this parameter block the inorganic powder quantity effect from reaching higher values and, normally, with the side effect of lower brightness.

The aforesaid solid state solution is formed through different valence 3 rare earth quantum rare earth cations. It is not the only possible catalyst compounds produced by n-2-silicate. The second type possible is rare earth elements valence 2 ions entering into second tier element cation fields. In the cation sub lattice field $Ca^{+2}$, $Sr^{+2}$ or $Ba^{+2}$ ion locations may be replaced by catalyst ions. Under these conditions, their oxidation levels are +2. These types of valence 2 ions include these ions such as $Eu^{+2}$, $Sm^{+2}$, $Yb^{+2}$, $Dy^{+2}$. As when using valence 2 rare earth element ions to replace $Ca^{+2}$ ions, in the crystal lattice, these catalytic ions may enter $Mn^{+2}$, $Sn^{+2}$, and $Pb^{+2}$. They belongs typical chemical d-elements. Inside the lattice, the existence of these ions may acquire other wave sections in the light spectrum, such as blue, green, and red, visible light sub-waves.

The above-formed similar multiple band lighting waveforms are very important advantages for the n-2-silicate based inorganic powder families. In practice, in the similar materials, all the known catalyst ions are very active. Table 1 lists the known lighting systems' crystal matrix physical and chemical parameters comparison. It shows that even a small crystal lattice to n-2-silicate ratio may promote the increase of lighting performance.

TABLE 1

| | | Compounds | | |
|---|---|---|---|---|
| No | Parameter | $Me_2SiO_4$ | $Me^{+2}{}_3Si_3O_{12}$ | $Me^{+2}{}_1Ln_2Si_2O_8$ |
| 1 | Crystal system | hexahedron | Three dimension | hexagonal |
| 2 | Space group | Pnam | Ja3d | P62m |
| 3 | Crystal lattice unit volume | 12 atom | 20 atom | 14-28 atom |
| 4 | Solubility of $Ln^{+3}$ in compounds | Very limited | ~10% | Average 40% |
| 5 | Solubility of $Ln^{+2}$ in compounds | ~5% | ~10% | Average 25% |

The distance between the n-2-calcium silicate and lanthanum is 20-25% smaller than the distance between hexagonal n-silicate and cubic silicates. The reduction of distances between ions not only increase the ladder slope inside the crystal field, but also lowers symmetry. These two physical processes will broaden the catalyst light wave spectrum of catalyst inside the n-2-silicate matrix. The wider wave spectrum normally lowers the Lumen value equivalent light. If the standard value is L=380 Lumen/watt, the half span light spectrum spectrum curve is $\lambda_{0.5}$=125 nm. Then, for the wider wave spectrum's broadband emission body, this value will be lowered to L=280 Lumen/watt. Then, broad band illumination at the same time will promote, in practice, the duplication of all colors in the full light spectrum range. The last situation indicates that for broadband emitters, the rendering coefficient, Ra, may be increased. Under standard inorganic powder conditions, this coefficient is 62. When excited by UV (ultraviolet) light, this coefficient is 87.

The advantages of inorganic powder developed in this invention are displayed in the components of the materials. The materials lie in the formation of the cation sub lattice circulation system of an exemplary embodiment. In the embodiment, $Me^{+2}$ includes $Mg^{+2}$, $Ca^{+2}$, $Sr^{+2}$ and $Ba^{+2}$, and the concentrations of each element are:

$$0.0 \leq Mg \leq 0.2;\ 0.4 \leq Ca \leq 0.8;\ 0.2 \leq Sr \leq 0.4;$$
$$0.2 \leq Ba \leq 0.4$$

where the concentration value is: $\Sigma(Me^{+2}+TR^{+2})=1$. In the embodiment, $Ln^{+3}$ includes $Y^{+3}$, $La^{+3}$, $Gd^{+3}$, $Sc^{+3}$ and $Lu^{+3}$, and the rare earth ion contents at the second cation node are:

$$0.5 \leq Y \leq 1.6;\ 0.1 \leq La \leq 0.4;\ 0.2 \leq Gd \leq 0.4;$$
$$0.1 \leq Sc \leq 0.2;\ 0.1 \leq Lu \leq 0.2$$

the aforesaid inorganic powder configuration principle is as follows. In the first cation node are all the known IIA family ions, such as $Mg^{+2}$, $Ca^{+2}$, $Sr^{+2}$, and $Ba^{+2}$. Apparently, the last 3 ions mentioned before, that is $Ca^{+2}$, $Sr^{+2}$, and $Ba^{+2}$ are compatible. The fourth cation, that is $Mg^{+2}$, may exist in a minor amount in the ion components, until gone.

However, three of the four main valence 2 ions are required to produce the inorganic powder. Under these conditions, there are breaks of inorganic powder matrix crystal lattices (volume increase). This increases the solubilities of the 2 valence catalyst ions, such as $Sm^{+2}$, $Yb^{+2}$, $Eu^{+2}$, and $Dy^{+2}$. The differences between these valence 2 ions and sub-group $Ba^{+2}$ cation are the radiation gram calorie (energy level). This determines the lighting ability and lighting spectrum of the inorganic powder.

The principle of several rare earth elements coexisting inside the lattice cation nodes has been used in this invention for the filling of the inorganic powder ingredient rare earth element (Number 2) node. Within two cation fields, all the five rare earth elements Ln exist that are not equipped with lighting energy (level) within the range of visible light. The inorganic powder components used are $Y^{+3}$, $La^{+3}$, $Gd^{+3}$, $Sc^{+3}$ and $Lu^{+3}$. Among them, the contents of $Y^{+3}$ are $0.5 \leq Y \leq 1.6$ atomic weight. Among them, La content is between $0.1 \leq La \leq 0.4$ atomic weight. Thus, it has to be pointed out that the rare earth element ions Y+La belong to two different sub-groups. They are the heavy sub-group and light sub-group, respectively.

To ensure that the group in the second cation node maintains the stability of the unusual combination of these ions, additional ions are added. They are gadolinium ion $0.2 \leq Gd \leq 0.4$, lutetium ion $0.1 \leq Lu \leq 0.2$ and scandium ion $0.1 \leq Sc \leq 0.2$. The inorganic powder base material's crystal lattice will then reach stability at this time. Even at the second field of the lattice, some of the rare earth element ions are replaced by $Tb^{+3}$, $Ce^{+3}$, $Eu^{+3}$, and $Dy^{+3}$ series catalytic rare earth ions. Within the catalyst ions, such as $Ce^{+3}$ and $Dy^{+3}$, exist two different rare earth element sub group. Thus, the five 5 Ln ions can be formed, and, at the same time, the second cation node may be lowered after the introduction of large particle $Ce^{+3}$ ions, and crushed with inorganic powder particles to produce mechanical strength for the lattice.

Adding $La^{+3}$ ion into the ingredients of cation node will increase the chemical parameters of the crystal lattice. At this time, the small particles of lutetium ion $Lu^{+3}$, located at the second part of the lattice crystal node, counter reacts with the lattice dimensions. Through the lowering of the crystal lattice parameters, the static electricity of the inside field increases. This phenomenon, together with the $Ce^{+3}$, $Eu^{+3}$, $Tb^{+3}$, and $Dy^{+3}$ base materials' inorganic powders, leads to the increase of the catalyst ion radiation shift strength. With the increase of the catalyst ion radiation shift strength, the light brightness of the inorganic powder inside the semi-conductor solid light source will increase.

The unique and beneficial properties of this inorganic powder shows in the ingredients of the inorganic powder. The characteristics are the main rare earth element $Ln^{+3}$ and partial replacement of 3 valence catalyst concentration values are equal to $\Sigma(Ln^{+3}+TR^{+3})=2$ atomic weight. Under these conditions, the individual concentration of the valence 3 catalyst ions of $Ce^{+3}$, $Eu^{+3}$, $Tb^{+3}$, $Dy^{+3}$ groups are between $0.001 \leq TR \leq 0.2$ atomic weight. This guarantees that the excited $Tb^{+3}$ rare earth element ion node's light spectrum is $\lambda=545\pm10$ nm. When the $Ce^{+3}$ ion is excited, green-yellow light is obtained. The light spectrum is between 525 nm and 575 nm. After adding $Eu^{+3}$ and $Dy^{+3}$ ions to the rare earth element node, the main light spectrum is located in the yellow-orange zones of visible light (wavelength=585-610 nm).

The embodiments of this invention use UV radiation wave lengths of $\lambda<430$ nm the solid light source excited inorganic powder light spectrum. The type of ingredients is (Ca, Sr, Ba)(Y, La, Gd, Lu, Sc)$_2$Si$_2$O$_8$. Among them, the $Ce^{+3}$ ion light emission towards broad band zone wavelengths are $\lambda=500$ to 720 nm. They include the green, yellow, orange and red color zones of the visible light. The $Tb^{+3}$ ion light spectrum covers $Ce^{+3}$ ion light spectrum. The highest wavelengths in the light spectrum are green light and yellow light with sub-energy band perimeter wavelength as λ=545±10 nm. Using the europium ion to excite, the light emission will appear in the orange light spectrum zone λ=610-625 nm. The excited catalyst ion $Dy^{+3}$ is a narrow band spectrum. The highest spectrum value is λ=576 nm.

From the above information, it can be determined that inorganic powder radiations may be broadband and narrow band. The radiation movement changes at the same time. For example, $Ce^{+3}$ ion has very short radiation, equals to τ≤100 ns. The properties of $Tb^{+3}$ and $Eu^{+3}$ inorganic powder are that the residual light's average time is between 1 to 5 ms.

The aforesaid high light spectrum kinetic properties are shown in their ingredient properties. The material absorption spectrum, when using europium ion ($Eu^{+2}$) and/or samarium ion ($Sm^{+2}$) and/or ytterbium ion to catalyze the inorganic powder, tends toward blue (wavelength=450-480 nm) and sky blue (wavelength=480-510 nm) sub-energy bands of the visible spectrum. At this time, the aforesaid ion radiation wavelengths are at the green-sky blue (wavelength=400-530 nm) sub-energy band, and the half span of the radiation band is $\lambda_{0.5}$=40-80 nm.

The $Eu^{+2}$, $Sm^{+2}$, and $Yb^{+2}$ series valence 2 rare earth element ion excites the first cation node results that inorganic powder particle emits sand color-yellow color. This is related to the special energy conditions; that is, the electric shift band between $O^{-2}$ and $TR^+$ ion, inside the inorganic powder lattice. This strong energy band presents strong absorption wavelength for short wave between 400 nm and 480 nm to color the inorganic powder. Normally, through adding $Eu^{+2}$, $Sm^{+2}$ and even $Yb^{+2}$ to the ingredients of inorganic powder, the surface color of the inorganic powder is increased.

The use of $Eu^{+2}$ catalyzed n-silicate inorganic powder light spectrum has special properties (wavelengths between 480 and 530 nm). $Sm^{+2}$ catalyzed inorganic powder wavelength is (540 to 590 nm). $Yb^{+2}$ catalyzed inorganic powder wavelength is (420 nm).

After synthesizing the above-mentioned inorganic powder, the particle diameters are averaging 6-12 micrometers. After grinding to particle diameters below 2 to 3 micrometers, the performance will not be lost.

In the embodiment of this invention, to form light emission coating on the solid light source, the prepared polymer mixing materials based on aerosol is used as a base material. The mixing base materials include at least a aerosol, epoxy, or silicone (step 1). Afterwards, when the suspended material concentration is the lowest, the inorganic powder is then coated, layer by layer, onto the surface of the solid light source allomorphous (step 2). The thickness of each layer is 30-40 micrometers. For inorganic powder with a higher concentration of suspended material, the thickness may be 60-70 micrometers, as a single layer, for coating on the surface of the allomorphous solid light source.

Then, the allomorphous coated with inorganic powder is welded into the body of the metal shell. (Step 3). Then, a lens polymer cover is added (Step 4). Between the shell inside surface and the inorganic powder polymer coating layer, silicone oxide aerosol and polymer mixing materials are added. (Step 5).

In the aforesaid structure, the voltage supply to the allomorphous electrodes is $V_F$=4V. The current is $I_F$=50 mA. The observed white light color temperature T=4500K is as strong white light. When the light strength of the diode is at $2\Theta_{1/2}$=20°, it reaches J=2 candle light. As mentioned above, the novel inorganic powder chemical structure for a UV solid light source is a rare invention. The requirements for industrial applications, innovation and advancement are all met. Thus, this application is submitted in accordance with the law.

The aforesaid embodiments serve as examples, only. They are not intended to limit the scope of this invention.

What is claimed is:

1. An inorganic powder for a UV (ultraviolet) solid light source for UV LEDs (ultraviolet light emitting diodes), a formula is

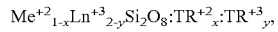
$$Me^{+2}_{1-x}Ln^{+3}_{2-y}Si_2O_8:TR^{+2}_x:TR^{+3}_y,$$

wherein:
Me$^{+2}$=(wherein Mg$^{+2}$, Ca$^{+2}$, Sr$^{+2}$, Ba$^{+2}$, at least one or more); TR$^{+2}$=(wherein Sm$^{+2}$, Yb$^{+2}$, Eu$^{+2}$, Dy$^{+2}$, at least one or more); TR$^{+3}$=(wherein Tb$^{+3}$, Ce$^{+3}$, Eu$^{+3}$, Dy$^{+3}$, at least one or more); Ln$^{+3}$=(wherein Y$^{+3}$, La$^{+3}$, Gd$^{+3}$, Sc$^{+3}$, Lu$^{+3}$, at least one or more), and x=0.0-0.2, y=0.0-0.1.

2. The inorganic powder for a UV (ultraviolet) solid light source for UV LEDs (ultraviolet light emitting diodes) as claimed in claim 1, wherein the formula forms a cation sub lattice circulation system, Me$^{+2}$ includes Mg$^{+2}$, Ca$^{+2}$, Sr$^{+2}$ and Ba$^{+2}$, and a concentration of each element is:

0≤Mg≤0.2; 0.4≤Ca≤0.8; 0.2≤Sr≤0.4; and 0.2≤Ba≤0.4.

3. The inorganic powder for a UV (ultraviolet) solid light source for UV LEDs (ultraviolet light emitting diodes) as claimed in claim 1, wherein Ln$^{+3}$ includes Y$^{+3}$, La$^{+3}$, Gd$^{+3}$, Sc$^{+3}$ and Lu$^{+3}$, and contents of rare earth ion in the second cation node are:

0.5≤Y≤1.6; 1≤La≤0.4; 2≤Gd≤0.4; 1≤Sc≤0.2; and 0.1≤Lu≤0.2.

4. The inorganic powder for a UV (ultraviolet) solid light source for UV LEDs (ultraviolet light emitting diodes) as claimed in claim 1, wherein individual concentrations of the Ce$^{+3}$, Eu$^{+3}$, Tb$^{+3}$, and Dy$^{+3}$ group valence 3 catalyst ions are about 0.001-0.2 atomic weight.

5. An inorganic powder for a UV (ultraviolet) solid light source for UV LEDs (ultraviolet light emitting diodes), a formula is

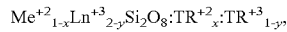
$$Me^{+2}_{1-x}Ln^{+3}_{2-y}Si_2O_8:TR^{+2}_x:TR^{+3}_{1-y},$$

wherein:
Me$^{+2}$ includes Mg$^{+2}$, Ca$^{+2}$, Sr$^{+2}$ and Ba$^{+2}$, wherein 0≤Mg≤0.2, 0.4≤Ca≤0.8; 0.2≤Sr≤0.4, and 0.2≤Ba≤0.4; TR$^{+2}$=(wherein Sm$^{+2}$, Yb$^{+2}$, Eu$^{+2}$, Dy$^{+2}$, at least one or more); TR$^{+3}$=(wherein Tb$^{+3}$, Ce$^{+3}$, Eu$^{+3}$, Dy$^{+3}$, at least one or more); Ln$^{+3}$=(wherein Y$^{+3}$, La$^{+3}$, Gd$^{+3}$, Sc$^{+3}$, Lu$^{+3}$, at least one or more), and x=0.000-0.2, y=0.000-0.1.

6. An inorganic powder for a UV (ultraviolet) solid light source for UV LEDs (ultraviolet light emitting diodes), a formula is

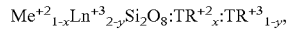
$$Me^{+2}_{1-x}Ln^{+3}_{2-y}Si_2O_8:TR^{+2}_x:TR^{+3}_{1-y},$$

wherein:
Me$^{+2}$ includes Mg$^{+2}$, Ca$^{+2}$, Sr$^{+2}$ and Ba$^{+2}$, wherein 0≤Mg≤0.2, 0.4≤Ca≤0.8; 0.2≤Sr≤0.4, and 0.2≤Ba≤0.4; TR$^{+2}$=(wherein Sm$^{+2}$, Yb$^{+2}$, Eu$^{+2}$, Dy$^{+2}$, at least one or more); TR$^{+3}$=(wherein Tb$^{+3}$, Ce$^{+3}$, Eu$^{+3}$, Dy$^{+3}$, at least one or more); Ln$^{+3}$ includes Y$^{+3}$, La$^{+3}$, Gd$^{+3}$, Sc$^{+3}$ and Lu$^{+3}$, wherein 0.5≤Y≤1.6; 1≤La≤0.4; 2≤Gd≤0.4; 1≤Sc≤0.2; and 0.1≤Lu≤0.2, and x=0.000-0.2, y=0.000-0.1.

* * * * *